(12) United States Patent
Richetto et al.

(10) Patent No.: US 7,361,830 B2
(45) Date of Patent: Apr. 22, 2008

(54) POLYMER ENCAPSULATED MICRO-THERMOCOUPLE

(75) Inventors: Audeen Richetto, Maple Grove, MN (US); Pete Bernier, Minneapolis, MN (US)

(73) Assignee: RTD Company, Ham Lake, MN (US)

( * ) Notice: Subject to any disclaimer, the term of this patent is extended or adjusted under 35 U.S.C. 154(b) by 591 days.

(21) Appl. No.: 10/391,531

(22) Filed: Mar. 17, 2003

(65) Prior Publication Data
US 2003/0209264 A1 Nov. 13, 2003

Related U.S. Application Data

(60) Provisional application No. 60/366,435, filed on Mar. 21, 2002.

(51) Int. Cl.
*H01L 35/02* (2006.01)
*A61B 5/00* (2006.01)

(52) U.S. Cl. .................. 136/233; 136/230; 136/232; 600/549

(58) Field of Classification Search ........ 136/221–242; 374/179–182; 600/549
See application file for complete search history.

(56) References Cited

U.S. PATENT DOCUMENTS

| | | | | |
|---|---|---|---|---|
| 5,769,622 A | * | 6/1998 | Aoki et al. ............... 431/80 |
| 5,955,960 A | * | 9/1999 | Monnier ................. 340/5.2 |
| 6,078,830 A | | 6/2000 | Levin et al. ............. 600/374 |
| 6,213,995 B1 | | 4/2001 | Steen et al. ............. 604/527 |
| 6,322,559 B1 | * | 11/2001 | Daulton et al. ......... 606/41 |
| 6,440,129 B1 | | 8/2002 | Simpson ................. 606/42 |
| 6,456,863 B1 | | 9/2002 | Levin et al. ............. 600/374 |
| 6,547,788 B1 | * | 4/2003 | Maguire et al. ......... 606/41 |
| 2004/0238023 A1 | | 12/2004 | Richetto et al. |

FOREIGN PATENT DOCUMENTS

JP 57-079689 * 5/1982

OTHER PUBLICATIONS

Lomber, Steven G. et al, "The cryoloop: an adaptable reversible cooling deactivation method for behavioral or electrophysiological assessment of neural function" J. Neurosci. Meth. 86, 179-194. (1999).*
Small Parts Inc. website http://www.smallparts.com/search/search.cfm. Information for Part No. SMT-16-12, Aug. 17, 2006, 1 page.*
Mark Saab, "Using Thin-Wall Heat-Shrink Tubing in Medical Device Manufacturing", from website http://www.devicelink.com/mddi/archive/99/04/006.html. Apr. 1999, 6 pages.*

(Continued)

*Primary Examiner*—Nam Nguyen
*Assistant Examiner*—Jeffrey Barton
(74) *Attorney, Agent, or Firm*—Schwegman, Lundberg & Woessner, P.A.

(57) ABSTRACT

A thermocouple produced by removing insulation from a distal end of each of at least first and second thermocouple conductors, forming a thermocouple junction at the distal ends of the at least first and second thermocouple conductors, placing the thermocouple junction into the heat shrinkable polymer material by sliding a second end of the tube of heat shrinkable polymer material over the thermocouple junction and sealing the thermocouple junction by heating and melting the polymer material.

18 Claims, 3 Drawing Sheets

OTHER PUBLICATIONS

"Fluoroplastic Heat Shrink Tubing" website, from http://www.texloc.com site of Dec. 26, 2001, available from www.archive.org. 3 pages.*

Pico Technologies website, http://www.picotech.com/applications/thermocouple.html from May 8, 1999, available from www.archive.org. 4 pages.*

Webster's Third New International Dictionary entry for "melt". 1993, 2 pages.*

Advanced Polymers Inc. "The World's Thinnest, Smallest, & Strongest Heat Shrink Tubing" brochure. 2 pages. Date not available.*

Richetto, Audeen, et al., "Multi-Point Polymer Encapsulated Micro-Thermocouple", U.S. Appl. No. 60/455,617, filed Mar. 17, 2003, 18 pgs.

* cited by examiner

POLYMER ENCAPSULATED MICRO-THERMOCOUPLE

RELATED APPLICATIONS

As provided under 35 U.S.C. § 119(e), this patent application claims the benefit of related U.S. Provisional Application No. 60/366,435 filed Mar. 21, 2002, which is hereby incorporated by reference in its entirety.

TECHNICAL FIELD

This patent application relates to thermocouple devices, and in particular, to a thermocouple device produced by encapsulating a thermocouple junction with a heat-shrinkable polymer coating.

BACKGROUND

A thermocouple is a bimetal junction that provides a voltage proportional to temperature. Temperature probes are often formed using thermocouples. Many applications requiring temperature probes require extremely small size.

One application for extremely small temperature probes is in the medical device industry; especially for use in catheters. For example, ablation catheters are used in non-invasive treatment of heart abnormalities. The ablation catheter is able to identify abnormal tissue growth and uses heat to remove the tissue causing the additional conduction paths. Thermal feedback is required when removing the tissue to prevent blood clotting or blood boiling during the procedure. In using a temperature probe to provide this feedback, the probe must be small enough to get as near an ablation electrode as possible. Also, when used in catheters, it is desirable that a temperature probe not rupture a catheter sleeve by tearing or abrasion. Further, a probe should be electrically insulated to allow in vivo operation.

It is apparent that uses for extremely small temperature probes beyond the medical field are possible. An extremely small probe would be useful in any field where a measurement of a localized temperature variation is desired, such as for example, the field of electronics.

What is needed is an insulated thermocouple device of extremely small size.

SUMMARY

This document discusses an insulated thermocouple device of extremely small size. The thermocouple is produced by removing insulation from distal ends of two thermocouple conductors and then forming a thermocouple junction at the distal ends of the two thermocouple conductors. A tube of heat shrinkable polymer material is placed over the thermocouple junction. The entire thermocouple junction is then sealed by heating and melting the polymer material.

The resulting thermocouple and seal fall within a reproducible confined shape, where the height of the confined shape falls within a range of about 0.003 to 0.010 inches and the width of the confined shape falls within a range of about 0.005 to 0.0110 inches.

This summary is intended to provide an overview of the subject matter of the present application. It is not intended to provide an exclusive or exhaustive explanation of the invention. The detailed description is included to provide further information about the subject matter of the preset patent application.

BRIEF DESCRIPTION OF THE DRAWINGS

In the drawings like numerals refer to like components throughout the several views.

DETAILED DESCRIPTION

In the following detailed description, reference is made to the accompanying drawings which form a part hereof, and specific embodiments in which the invention may be practiced are shown by way of illustration. It is to be understood that other embodiments may be used and structural changes may be made without departing from the scope of the present invention.

Figure 1:
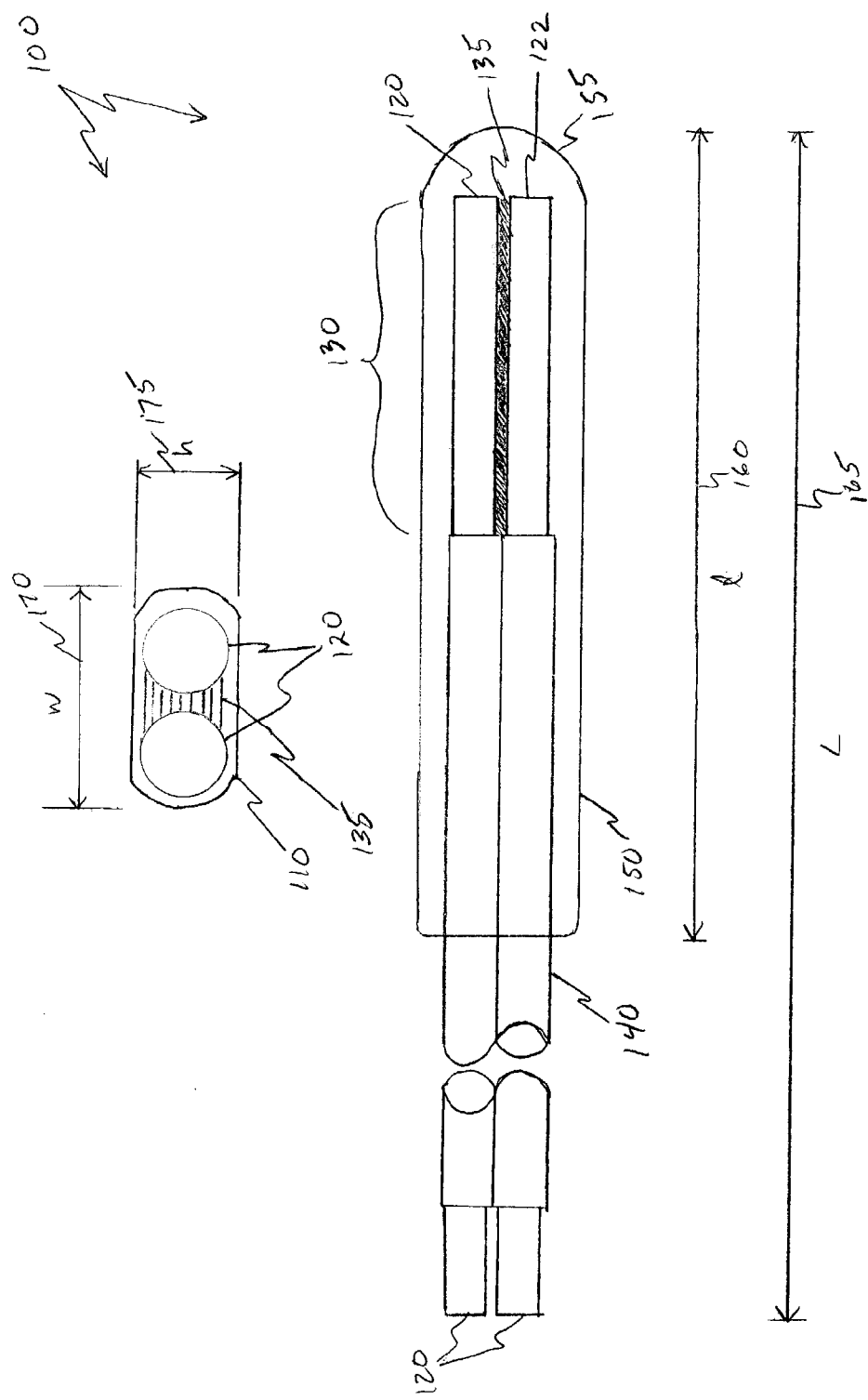
FIG. 1 is a drawing of one embodiment of the micro-thermocouple.

As stated previously, the present application is concerned with materials and techniques used to create a sealed thermocouple of extremely small size. FIG. 1 shows one embodiment of a micro-thermocouple 100. The thermocouple junction 130 is formed from joining conductors 120, 122 of dissimilar metals. The metals comprise any of the standard metal combinations defined by the American Society of Testing and Materials (A.S.T.M.) for thermocouples. The size of the thermocouple conductors generally fall with a range of about 30 awg (0.010 inch diameter) to about 50 awg (0.0009 inch diameter). In one embodiment conductors 120, 122 are joined to form a thermocouple junction 130 by soldering using lead-free solder 135. In another embodiment, conductors 120, 122 are welded and 135 represents a welded bead or seam. Beyond the thermocouple junction 130, the conductors 120, 122 are electrically insulated with commonly used insulating material 140 such as nylon, polyurethane, or polyimide. A heat shrinkable polymer material is then used to form an electrically insulating seal 150 over the micro-thermocouple 100. To create the seal 150, a tube is slid over the thermocouple junction. In one embodiment, the tube is slid over the thermocouple junction and the seal 150 is then formed by heating the tube of polymer material to the point of melting onto and over the thermocouple joint 130 and onto the insulation 140. Melting the polymer material onto the thermocouple conductor insulation 140 provides a seal around the insulation 140. The melting also forms a domed shape 155 on the end of micro-thermocouple 100. This domed end 155 is advantageous if the thermocouple is used in a catheter as it results in the micro-thermocouple 100 being resistant to abrading or tearing a catheter sleeve. In another embodiment, the tube of heat shrinkable polymer material is first sealed on one end by melting the end and forming the domed end before the tube is slid over the thermocouple junction. After the tube is slid over the thermocouple junction 130, further heating and melting provides the insulating seal 150. Other embodiments involve sealing the end while it is placed over the thermocouple junction 130.

The length (l) 160 of the resultant seal 150 is within the range of about 0.05 inches to 0.5 inches. The overall length (L) 165 of the micro-thermocouple 100 is within the range of about 20 inches to 78 inches. One embodiment of the micro-thermocouple 100 uses polyethylene terephthalate (PET) as the polymer material. Another embodiment uses fluorinated ethylene propylene (FEP). The seal 150 is moisture resistant and electrically insulating. The insulation resistance of the seal is greater than 100 Mega-ohms when measured at 50 Volts(DC).

FIG. 1 also shows a cross section 110 of micro-thermocouple 100. The width (w) 170 of the micro-thermocouple 100 falls within a range from about 0.005 inches to 0.011 inches. The height (h) 175 of the micro-thermocouple 100 falls within a range of about 0.003 inches to 0.01 inches. Thus, it can be seen that the micro-thermocouple can be formed within a reproducible confined shape having a height 175 less than about 0.01 inches and a width 170 less than about 0.011 inches. The final dimensions of the confined shape is determined in part by the gauge of the thermocouple conductors used. Providing the insulation by the technique described herein adds about 0.0005 inches to the width and height dimensions of a formed thermocouple junction.

Figure 2:
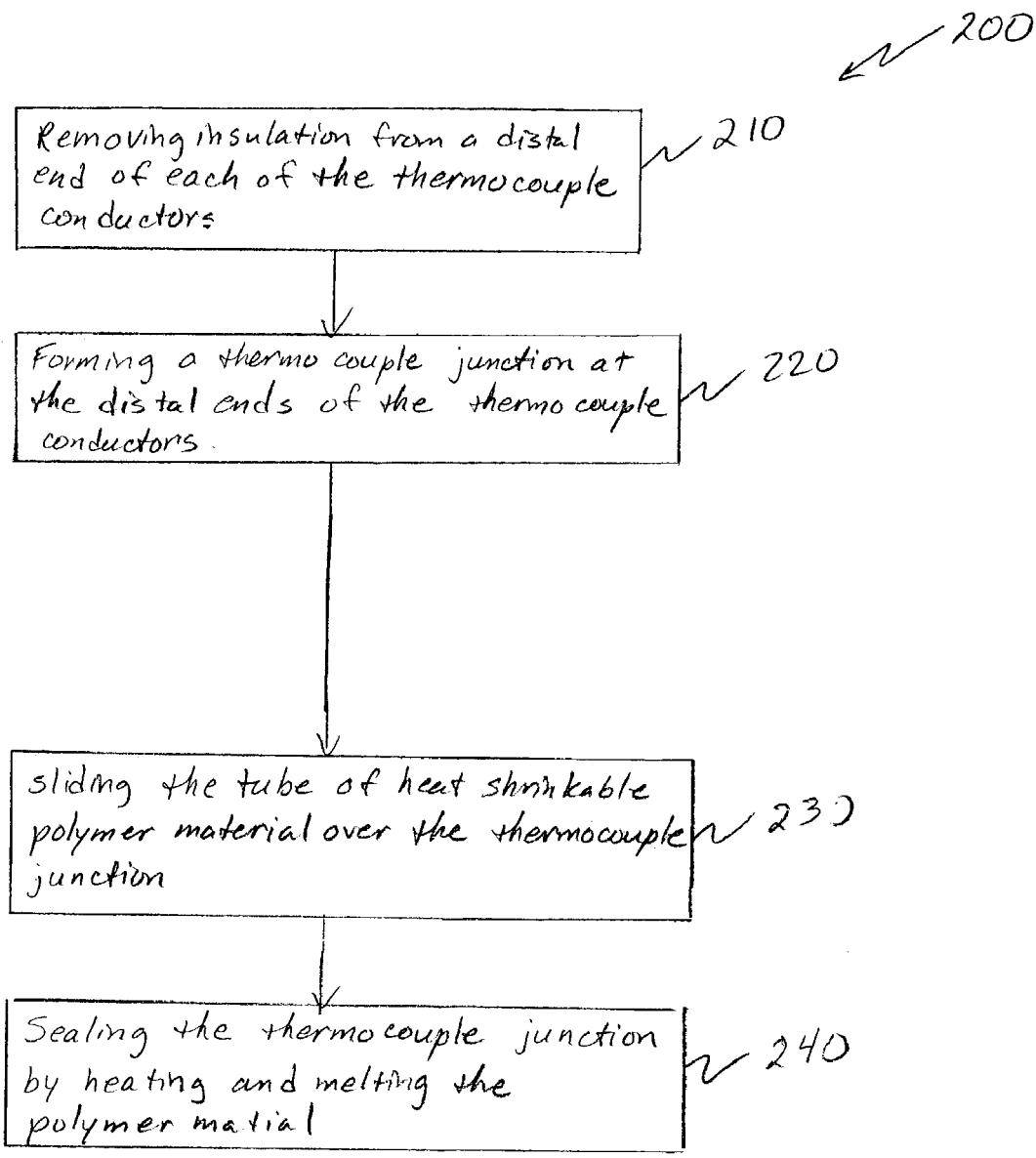
FIG. 2 is a flowchart showing one method for forming the micro-thermocouple.

FIG. 2 shows a flowchart of one embodiment of a method 200 of forming micro-thermocouple 100. At 210, insulation 140 is removed from a distal end of thermocouple conductors 120, 122. At 220, a thermocouple junction 130 is formed at the distal end of the conductors 120, 122. At 230, the tube of polymer material is slid over the thermocouple junction 130. At 240, a seal 150 is formed over the thermocouple junction 130 by heating and melting the polymer material.

Figure 3:
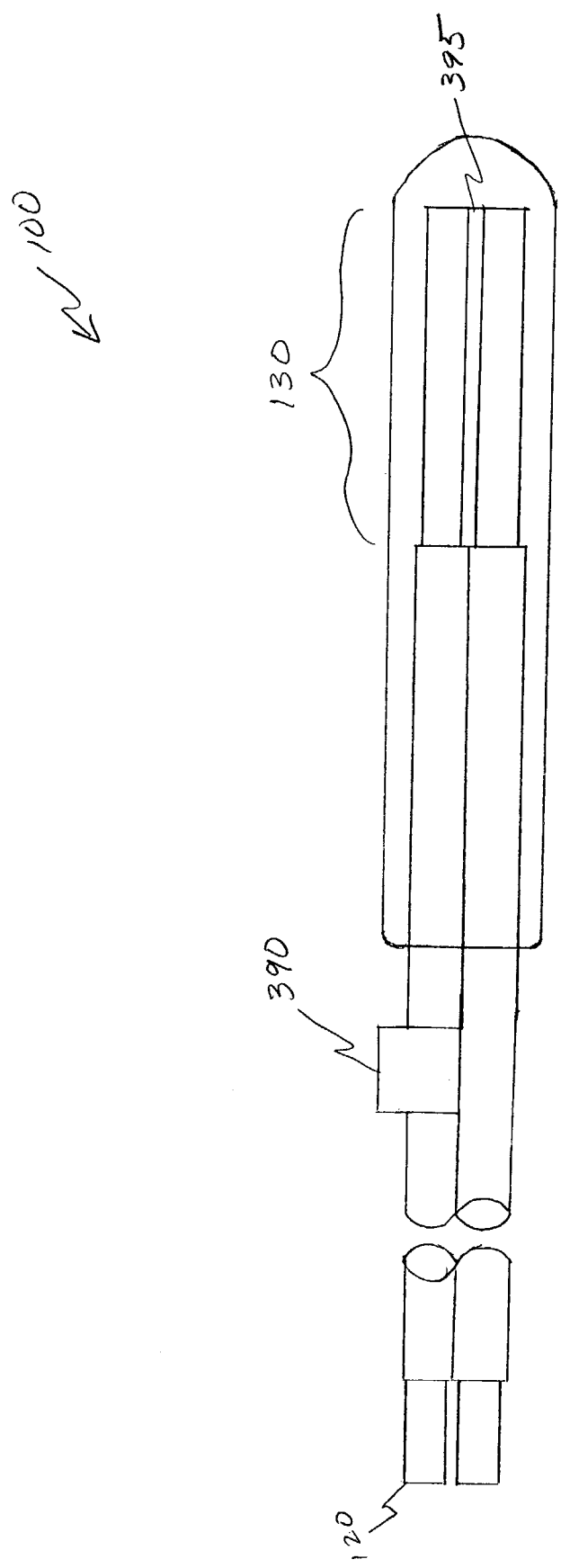
FIG. 3 is a drawing of showing fused embodiments of the micro-thermocouple.

FIG. 3 shows fused embodiments of the micro-thermocouple 100. A fused thermocouple prevents the possibility of recycling or reusing the thermocouple if the micro-thermocouple 100 is used in a medical device. In one embodiment a fuse 390 is placed in a thermocouple conductor 120 between a proximal end of the conductor 120 and the thermocouple joint 130. Exceeding the rating of the fuse breaks the electrical connection between the proximal end of conductor 120 and the thermocouple joint. In another embodiment, a fuse 395 is formed by placing within the thermocouple junction 130. Exceeding the rating of the fuse 395 across the thermocouple conductors 120 causes the device to lose the properties of a thermocouple.

Although specific examples have been illustrated and described herein, it will be appreciated by those of ordinary skill in the art that any arrangement calculated to achieve the same purpose could be substituted for the specific example shown. This application is intended to cover any adaptations or variations of the present invention. Therefore, it is intended that this invention be limited only by the claims and the equivalents shown.

What is claimed is:

1. A method comprising:
    removing insulation from a distal end of each of at least first and second thermocouple conductors;
    forming a thermocouple junction at the distal ends of the at least first and second thermocouple conductors;
    placing the thermocouple junction into a heat shrinkable polymer material by sliding an end of a tube of heat shrinkable polymer material over the thermocouple junction; and
    sealing the thermocouple junction by heating and melting the polymer material.

2. The method of claim 1, wherein sealing the thermocouple junction includes producing a reproducible confined shape having a height less than about 0.010 inches and a width less than about 0.0110 inches.

3. The method of claim 2, wherein a height of the confined shape falls within a range of about 0.003 to 0.010 inches.

4. The method of claim 2, wherein a width of the confined shape falls within a range of about 0.005 to 0.0110 inches.

5. The method of claim 1, wherein a length of the thermocouple junction and the polymer material falls within a range of about 0.05 to 0.5 inches.

6. The method of claim 1, wherein the placing the thermocouple junction into the heat shrinkable polymer material further comprises:
    melting a second end of the tube to form the second end into a sealed dome shape.

7. The method of claim 1, wherein forming the thermocouple junction comprises soldering the distal ends of the thermocouple conductors.

8. The method of claim 1, wherein forming the thermocouple junction comprises welding the distal ends of the thermocouple conductors.

9. The method of claim 1, wherein the thermocouple conductors are conductors of types selected from a set of A.S.T.M. types T, J, K, E, S, R, and B.

10. The method of claim 1, wherein the polymer material is polyethylene terephthalate (PET).

11. The method of claim 1, wherein the polymer material is fluorinated ethylene propylene (FEP).

12. The method of claim 1, wherein the thermocouple junction is adapted and sized to fit into a catheter.

13. The method of claim 1, wherein the thermocouple junction further comprises a fuse such that the fuse causes the device to lose the properties of a thermocouple when an electrical rating is exceeded across the thermocouple junction.

14. The method of claim 1, wherein the device further comprises a fuse placed between a proximal end of at least one of the thermocouple conductors and the thermocouple junction, such that exceeding an electrical rating of the fuse breaks an electrical connection between the proximal end of the conductor and the thermocouple junction.

15. The method of claim 1, wherein a length of the thermocouple junction is between about 0.03 inches to 0.07 inches.

16. The method of claim 1, wherein the heat shrinkable polymer material provides an insulation resistance which is greater than 100 Megaohms.

17. The method of claim 1, wherein a height of the sealed thermocouple junction is between about 0.003 to 0.010 inches.

18. The method of claim 17, wherein a width of the sealed thermocouple junction is between about 0.005 to 0.011 inches.

* * * * *